(12) United States Patent
Suzuki

(10) Patent No.: US 8,194,220 B2
(45) Date of Patent: Jun. 5, 2012

(54) IN-PLANE SWITCHING MODE LIQUID CRYSTAL DISPLAY DEVICE

(75) Inventor: Teruaki Suzuki, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 233 days.

(21) Appl. No.: 12/494,872

(22) Filed: Jun. 30, 2009

(65) Prior Publication Data

US 2010/0020283 A1    Jan. 28, 2010

(30) Foreign Application Priority Data

Jul. 22, 2008   (JP) ................. 2008-188243

(51) Int. Cl.
G02F 1/1343   (2006.01)

(52) U.S. Cl. ..................................... 349/141

(58) Field of Classification Search .............. 349/141
See application file for complete search history.

(56) References Cited

U.S. PATENT DOCUMENTS

| | | | |
|---|---|---|---|
| 3,807,831 A | 4/1974 | Soref | |
| 4,345,249 A | 8/1982 | Togashi | |
| 5,905,556 A | 5/1999 | Suzuki et al. | |
| 6,583,839 B2 | 6/2003 | Suzuki et al. | |
| 6,618,109 B2 * | 9/2003 | Hidehira et al. | 349/141 |
| 6,924,863 B2 | 8/2005 | Nishida et al. | |
| 2002/0159016 A1 | 10/2002 | Nishida et al. | |
| 2003/0081163 A1 | 5/2003 | Suzuki et al. | |

FOREIGN PATENT DOCUMENTS

| | | |
|---|---|---|
| JP | 56091277 | 7/1981 |
| JP | 7036058 | 2/1995 |
| JP | 10-026767 | 1/1998 |
| JP | 10-307295 | 11/1998 |
| JP | 2002-323706 | 11/2002 |

* cited by examiner

*Primary Examiner* — James Dudek

(74) *Attorney, Agent, or Firm* — Young & Thompson

(57) ABSTRACT

In an in-plane switching mode liquid crystal display device, a liquid crystal layer is interposed between a first substrate and a second substrate. The first substrate is provided with a first electrode member having a comb-tooth-like portion and a second electrode member so as to generate an electric field between the first electrode member and the second electrode member. Further, a protruded electrode member is provided so as to be branched from at least one of a portion short of a tip end portion and a portion short of a base portion of the comb-tooth-like portion so as to form a branched shape of an L-shaped portion in an integrated planar shape with combination of the protruded electrode member and one of the tip end portion and the base portion.

12 Claims, 13 Drawing Sheets

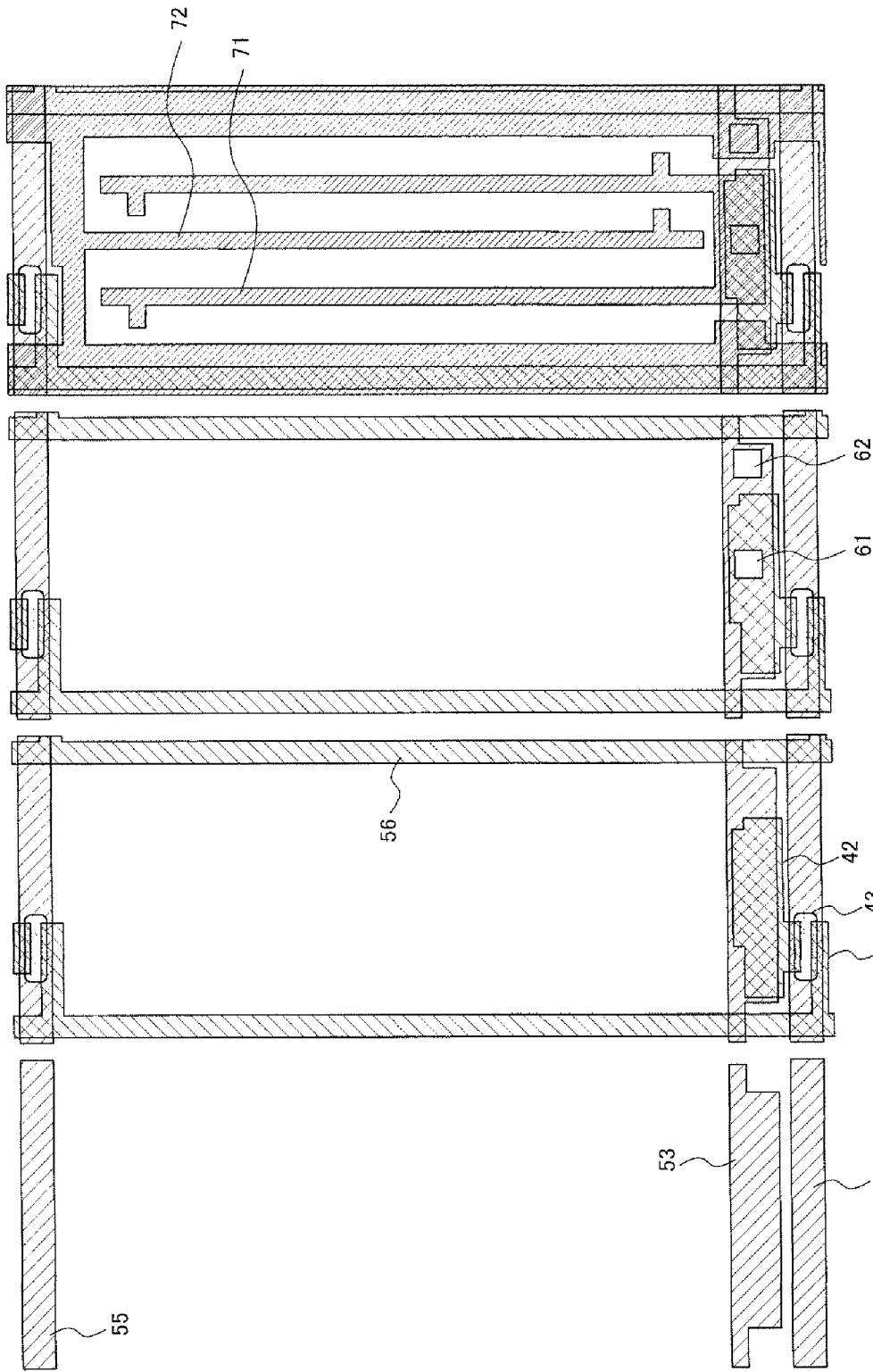

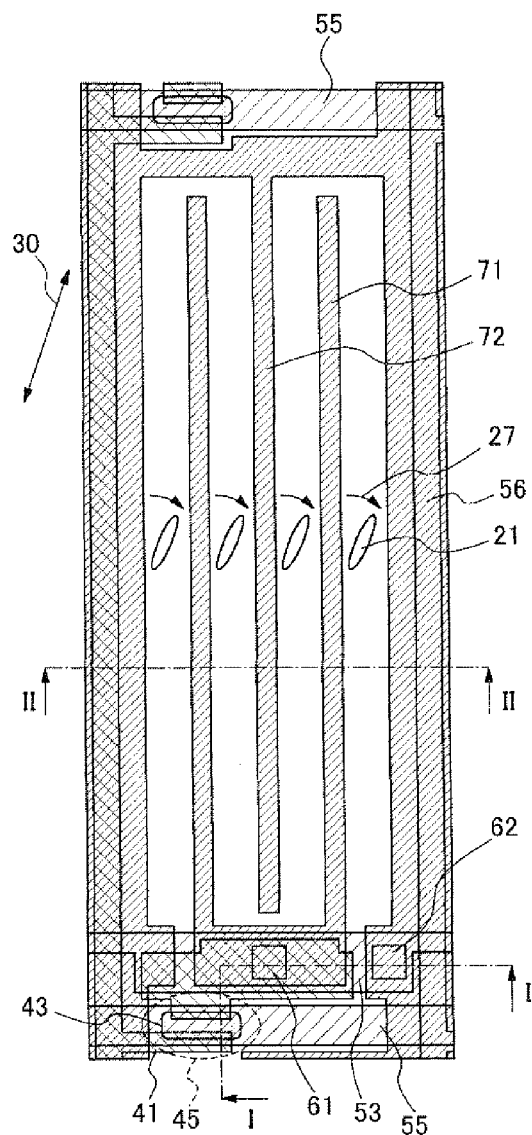
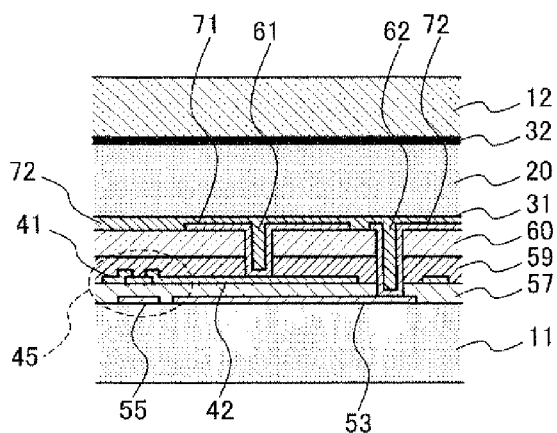
Fig. 11B
(Related Art)
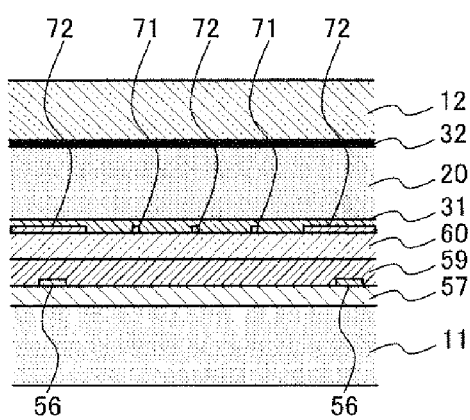
Fig. 11C
(Related Art)
Fig. 11A
(Related Art)

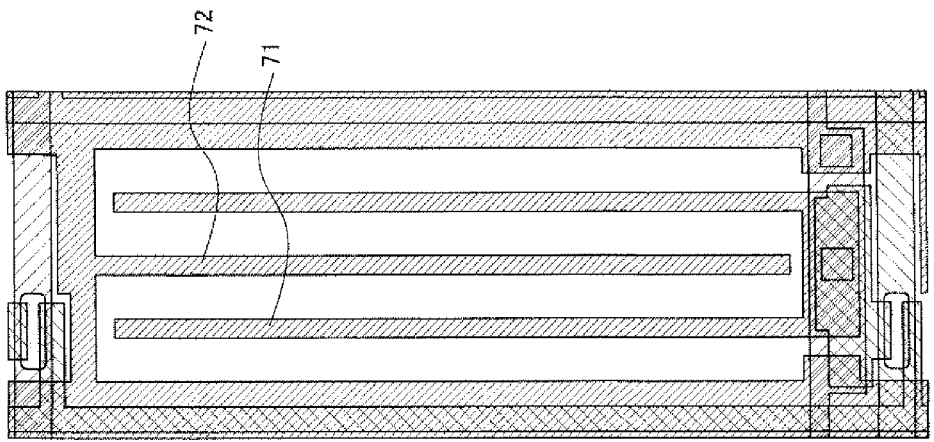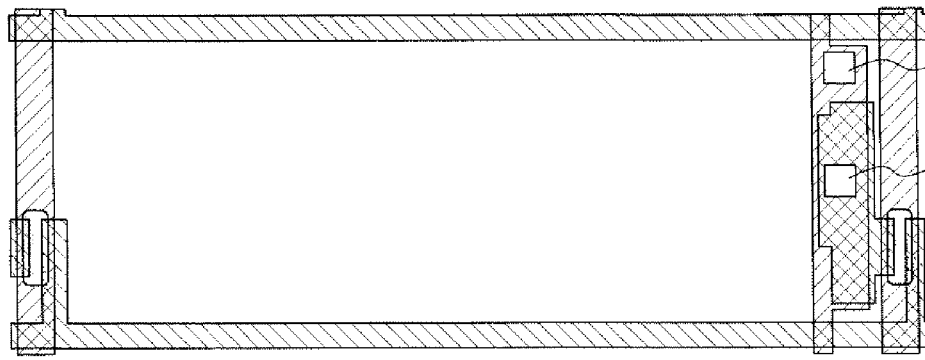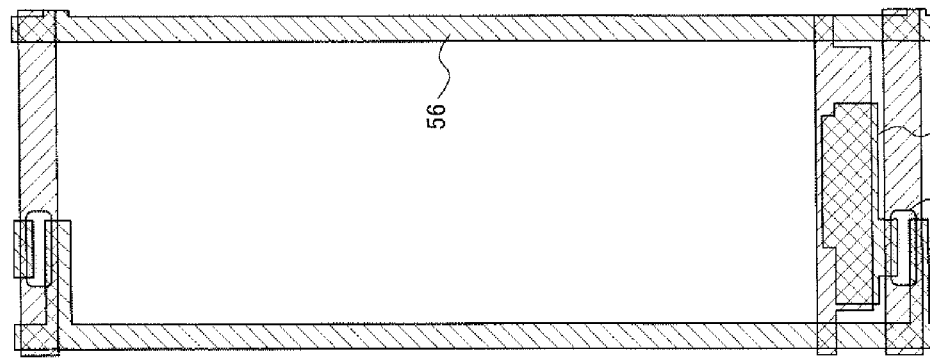

IN-PLANE SWITCHING MODE LIQUID CRYSTAL DISPLAY DEVICE

This application is based upon and claims the benefit of priority from Japanese Patent Application No. 2008-188243 filed on Jul. 22, 2008, the disclosure of which is incorporated herein in its entirety by reference.

TECHNICAL FIELD

The present invention relates to a liquid crystal display (LCD) device and more particularly to an in-plane switching (IPS) mode LCD device.

BACKGROUND ART

Generally, the LCD device has features of thin, lightweight, and low power consumption.

In particular, an active-matrix addressing LCD (AM-LCD) device that drives respective pixels arranged in a matrix array with active elements has ever been recognized as a high image quality flat panel display device. Especially, the AM-LCD device using thin-film transistors (TFTs) as the active elements is widely used as TFT-LCD devices.

Most of the TFT-LCD devices, which utilize the electro-optic effects of TN (Twisted Nematic) type liquid crystal sandwiched between two substrates, display images by applying an electric field approximately vertical to the surfaces of the substrates across the liquid crystal to thereby cause displacement of the liquid crystal (LC) molecules. These LCD devices are termed "vertical electric field type".

On the other hand, some LCD devices display images by applying an electric field approximately parallel to the surfaces of the substrates to thereby cause displacement of the LC molecules in the planes parallel to the surfaces of the substrates. These LCD devices are termed "lateral electric field type" or "in-plane switching (IPS) mode". Various improvements have ever been made for the IPS-mode LCD devices too. Some of the improvements will be exemplified below.

A structure using comb-tooth-like electrodes mated with each other in the IPS-mode LCD device is disclosed in U.S. Pat. No. 3,807,831 (patent document 1) issued in 1974 (refer to claim 1, FIGS. 1-4 and FIG. 11).

A technique using the comb-tooth-like electrodes mated with each other similar to those in the above-mentioned patent document 1 in the IPS-mode AM-LCD device utilizing the electro-optic effects of the TN type liquid crystal is disclosed in Japanese Unexamined Patent Publication No. 56-091277 (patent document 2) published in 1981 (refer to claim 2, FIG. 7 and FIGS. 9 to 13). This technique reduces the parasitic capacitance between a common electrode and drain bus lines, or that between the common electrode and gate bus lines.

A technique that realizes the IPS-mode LCD device without the comb-tooth-like electrodes in the AM-LCD device using TFTs is disclosed in Japanese Unexamined Patent Publication No. 7-036058 (patent document 3) published in 1995 (refer to claims 1 and 5, FIGS. 1 to 23). With this technique, the common electrode and image signal electrodes or the common electrode and LC driving electrodes are formed on different layers and at the same time, the common electrode or the LC driving electrodes is/are formed to be ring-shaped, cross-shaped, T-shaped, Π(Greek letter Pi)-shaped, H-shaped, or ladder-shaped.

A structure that the pixel electrode and the common electrode for generating the LC driving lateral electric field (both of which are comb-tooth-shaped) are disposed above (i.e., at closer positions to the LC layer) the bus lines (i.e., data lines) that supply signals to the active elements for driving respective pixels, where an insulating layer intervenes between the pixel electrodes and the common electrode, is disclosed in Japanese Unexamined Patent Publication No. 2002-323706 (patent document 4) published in 2002 (refer to claim 1, first exemplary embodiment, FIGS. 1 to 2). It is said that with this structure, since the electric field from the bus lines can be shielded by forming the common electrode to cover the bus lines, defective display caused by vertical crosstalk is prevented. Moreover, it is said that an aperture ratio is increased by forming the common electrode with transparent conductive material.

FIG. 11A through FIG. 11C are drawings explaining an example of the structure of a related-art popular IPS-mode AM-LCD device. FIG. 11A is a plan view of the device, FIG. 11B is a cross-sectional view along the I-I line shown in FIG. 11A, and FIG. 11C is a cross-sectional view along the II-II line shown in FIG. 11A. Moreover, FIG. 12A through FIG. 12D are partial plan views showing fabrication steps of the related-art LCD device. All of these drawings show the structure of one pixel region.

With the related-art LCD device, as shown in FIG. 11A and FIG. 12B, rectangular regions are formed by gate bus lines 55 extending along a horizontal direction of FIG. 11A and FIG. 12B and drain bus lines 56 extending along the vertical direction thereof. Pixel regions are formed in the respective rectangular regions. Pixels are arranged in a matrix array as a whole.

Common bus line 53 is formed to extend along the horizontal direction of FIG. 11A and FIG. 12B for each pixel, similar to the gate bus lines 55. At the respective intersections of the gate bus lines 55 and the drain bus lines 56, TFTs 45 (see FIG. 11A and FIG. 11B) are formed corresponding to the respective pixels. A drain electrode 41, a source electrode 42, and a semiconductor film 43 of each TFT 45 are formed to have patterns or shapes shown in FIG. 12B, respectively.

The pixel electrode 71 and the common electrode 72, which generate a liquid-crystal (LC) driving electric field, configure comb-tooth-like portions (i.e., thin belt-shaped parts protruding into the pixel region) mated or engaged with each other, respectively. Here, as an example, the number of the comb-tooth-like portions of the pixel electrode 71 is two and the number of the comb-tooth-like portions of the common electrode 72 is one.

As shown in FIG. 11B, the pixel electrode 71 is electrically connected to the corresponding source electrode 42 of the TFT 45 by way of a corresponding contact hole 61 that penetrates through an organic interlayer film 60 and a protective insulating film 59.

The common electrode 72 is electrically connected to the corresponding common bus line 53 by way of a corresponding contact hole 62 that penetrates through the organic interlayer film 60, the protective insulating film 59, and an interlayer insulating film 57.

Part of the source electrode 42 of the TFT 45 is overlapped with the corresponding common bus line 53, thereby forming a storage capacitor for the pixel region by the overlapped part.

The cross-sectional structure of the related-art LCD device is shown in FIG. 11B and FIG. 11C, where this device is configured by coupling and unifying an active-matrix substrate and an opposite substrate to sandwich a liquid crystal layer between them.

The active-matrix substrate comprises a transparent glass substrate 11, the common bus lines 53, the gate bus lines 55, the drain bus lines 56, the TFTs 45, the pixel electrode 71, and the common electrode 72, all of which are formed on or over an inner surface of the glass substrate 11. The common bus lines 53 and the gate bus lines 55, which are directly formed on the inner surface of the glass substrate 11, are covered with the interlayer insulating film 57. The drain electrodes 41, the source electrodes 42, and the semiconductor films 43 of the TFTs 45, and the drain bus lines 56 are formed on the interlayer insulating film 57. Thus, the common bus lines 53 and the gate bus lines 55 are electrically insulated from the drain electrodes 41, the source electrodes 42, the semiconductor films 43, and the drain bus lines 56 by the interlayer insulating film 57.

These structures formed on the glass substrate 11 are covered with the protective insulating film 59 except for the regions where the contact holes 61 and 62 are formed. The level differences caused by the contact holes 61 and 62 are planarized by the organic interlayer film 60 formed on the protective insulating film 59. The pixel electrode 71 and the common electrode 72 are formed on the organic interlayer film 60.

As explained above, the pixel electrode 71 is electrically connected to the corresponding source electrode 42 by way of the corresponding contact hole 61, and the common electrode 72 is electrically connected to the corresponding common bus line 53 by way of the corresponding contact hole 62. In addition, the cross-sectional views of FIG. 11B and FIG. 11C are schematically drawn and thus, they do not reproduce the actual level differences faithfully.

The surface of the active matrix substrate having the above-described structure, on which the pixel electrode 71 and the common electrode 72 are formed, is covered with an alignment film 31 formed by an organic polymer film. The surface of the alignment film 31 has been subjected to an alignment treatment for directing an initial orientation direction of LC molecules 21 to a desired direction (see a both way arrow 30 in FIG. 11A).

On the other hand, an opposite substrate (i.e., a color filter substrate) includes a transparent glass substrate 12; and a color filter (not shown) of three primary color layers of red (R), green (G) and blue (B) being formed so as to correspond to the respective pixel regions, and a light-shielding black matrix (not shown) formed on the regions other than those corresponding to the respective pixel regions. The color filter and the black matrix, which are formed on the inner surface of the glass substrate 12, are covered with an acrylic-based overcoat film (not shown).

On the inner surface of the overcoat film, columnar spacers (not shown) are formed to control a gap between the active-matrix substrate and the opposite substrate. The inner surface of the overcoat film is covered with an alignment film 32 formed by an organic polymer film. The surface of the alignment film 32 has been subjected to an alignment treatment for directing the initial orientation direction of the LC molecules 21 to a desired direction (see the both way arrow 30 in FIG. 11A).

The active-matrix substrate and the opposite substrate each having the above-described structure are overlapped on each other at a predetermined gap in such a way that their surfaces on which the alignment films 31 and 32 are respectively formed are directed inward and opposed to each other. Liquid crystal 20 is introduced into the gap between these two substrates. The peripheries of the substrates are sealed by a sealing member (not shown) to confine the liquid crystal 20 therein. A pair of polarizer plates (not shown) is arranged on the outer surfaces of the substrates, respectively.

The surfaces of the alignment films 31 and 32 have been uniformly alignment-treated in such a way that the LC molecules 21 are aligned in parallel along the desired direction when no electric field is applied, as described above. The alignment direction by the alignment treatments is a direction inclined clockwise by 15 degrees with respect to the direction along which the comb-tooth-like portions of the pixel and common electrodes 71 and 72 are extended (i.e., the vertical direction in FIG. 11A).

The transmission axes of the pair of polarizer plates are crossed at right angles. The transmission axis of one of the pair of polarizer plates is in accordance with the initial alignment direction of the LC molecules 21 determined by the uniform alignment treatment.

Next, the fabrication process steps of the related-art LCD device shown in FIG. 11A through FIG. 11C will be explained below with reference to FIG. 12A through FIG. 12D.

The active-matrix substrate is fabricated in the following way. First, a chromium (Cr) film is formed on one of the surfaces of the glass substrate 11 and patterned, thereby forming the common bus line 53 and the gate bus lines 55 having the shapes as shown in FIG. 12A. Thereafter, the interlayer insulating film 57, which is formed by a silicon nitride (SiNx) film, is formed to cover the common bus line 53 and the gate bus lines 55 over the whole surface of the glass substrate 11.

Subsequently, the semiconductor films 43 (which are usually formed by an amorphous silicon (a-Si) film) are formed to have island-shaped patterns on the interlayer insulating film 57 in such a way to be overlapped with the corresponding gate bus lines 55 by way of the interlayer insulating film 57.

Another Cr film is then formed on the interlayer insulating film 57 and patterned, thereby forming the drain bus lines 56, the drain electrodes 41 and the source electrodes 42 (see FIG. 12B). Thereafter, the protective insulating film 59 made of SiNx and the organic interlayer film 60 made of photosensitive acrylic resin are successively laminated on the interlayer insulating film 57 in this order to cover these structures.

Following this, the rectangular contact holes 61 penetrating through the protective insulating film 59 and the organic interlayer film 60 and the rectangular contact holes 62 penetrating through the interlayer insulating film 57, the protective insulating film 59, and the organic interlayer film 60 are formed (see FIG. 12C).

An TTO (Indium Tin Oxide) film, which is a transparent conductive material, is formed on the organic interlayer film 60 and patterned, and thereby forming the pixel electrode 71 and the common electrode 72 on the organic interlayer film 60. The pixel electrode 71 is in contact with the corresponding source electrode 42 by way of the corresponding contact hole 61. The common electrode 72 is in contact with the common bus line 53 by way of the corresponding contact hole 62 (see FIG. 12D and FIG. 11B). In this way, each pixel region of the active-matrix substrate is fabricated.

The opposite substrate (the color filer substrate) is fabricated in the following way. First, the color filter (not shown) and the light-shielding black matrix (not shown) are formed on one of the surfaces of the glass substrate 12 and thereafter, the overcoat film (not shown) is formed to cover the color filter and the black matrix over the whole surface of the glass substrate 12. Then, the columnar spacers (not shown) are formed on the overcoat film. In this way, the opposite substrate is fabricated.

The alignment films 31 and 32, which are made of polyimide, are formed on the surface of the active-matrix substrate and the surface of the opposite substrate fabricated as described above, respectively.

Next, the surfaces of the alignment films 31 and 32 are uniformly alignment-treated. These two substrates are then overlapped to have a constant gap (e.g., approximately 4.5 µm), and the peripheries of the coupled substrates are sealed by the sealing member except for an injection hole for the liquid crystal.

Next, in a vacuum chamber, a predetermined nematic liquid crystal (e.g., a nematic liquid crystal whose refractive index anisotropy is 0.067) is injected into the gap between the substrates through the injection hole and then, the injection hole is sealed.

After the substrates are coupled and unified in this way, the polarizer plates (not shown) are respectively adhered on the outer surfaces of the substrates. As a result, the related-art IPS-mode LCD device having the structure shown in FIG. 11A through FIG. 11C is completed.

With the related-art IPS-mode LCD device described above, it is known that the LC molecules are rotated to the direction opposite to the ordinary rotation direction in some regions (which are termed "reverse rotation domains") when the LC driving electric field is applied.

FIG. 13 is a drawing schematically showing the generation principle of the reverse rotation domains in the related-art LCD device shown in FIGS. 11-12. To facilitate the explanation, only the pixel electrode 71, the common electrode 72 and the LC molecules 21 are shown in FIG. 13. In FIG. 13, the LC driving electric field 100 (its electric lines of force), which is generated by the comb-tooth-like portions of the pixel electrodes 71 and the common electrode 72, is schematically illustrated.

The rotation direction 27 of the LC-molecules 21 (the rotation of the LC-molecules 21 is caused in planes approximately parallel to the active-matrix substrate and the opposite substrate) is defined by the relationship between the initial alignment direction 30 of the LC-molecules 21 and the direction of the LC driving electric field.

Therefore, the rotation direction 27 of the LC-molecules 21 is "clockwise" in almost all the pixel region. However, in the vicinities of the comb-tooth-like portions of the pixel electrode 71, the LC driving electric field is radial, as shown in FIG. 13. Thus, the LC-molecules 21 are rotated "counterclockwise" in the shadowed regions in the drawing. This means that the shadowed regions are the reverse rotation domains 80 where the LC-molecules 21 are rotated "counterclockwise".

Furthermore, Japanese Unexamined Patent Publication No. 10-307295 (patent document 5) published in 1998 discloses a technique that the electrodes for generating lateral electric field are bent to intentionally make the driving (rotating) direction of the LC molecules different in the respective regions with the bent parts of the electrodes, thereby reducing the display coloring in the slant views (see claims 1, 3 and 5, and FIGS. 1, 2, 4 and 6).

For example, the following structure is proposed. Specifically, the initial alignment direction of the LC molecules in the first sub-region is equalized to that in the second sub-region. When a voltage is applied, the LC molecules in the first and second sub-regions are rotated in opposite directions to each other while keeping the alignment directions of the LC molecules symmetrically in the first and second sub-regions (see claim 3). With this structure, preferably, the lateral electric field for driving the LC molecules is generated by the parallel electrode pair, and the electrodes constituting the parallel electrode pairs are bent into a V shape (see claim 5).

According to the conventional configuration shown in FIG. 13, in the vicinities of the comb tooth electrode tip portions, the LC driving electric field is distributed in a radiation shape, and being associated with an initial alignment direction of the liquid crystal, the area (the reverse rotation domains 80) are formed such that the LC molecules 21 rotate reversely opposite to the predetermined direction of its rotation. Because the LC driving electric field is gentle radiation shape in the vicinities of the comb tooth electrode tip portions, dark areas (i.e., boundary domains 90) which occurs between the reverse rotation domains 80 and the ordinary domains 70 becomes large. In addition to that, its position is unstable.

Accordingly, when the external pressure such as a finger pressing is added to the display surface, the state of the reverse rotation domains 80 (or, the position of the boundary domains 90) does not become stable, and after releasing the external pressure, it is recognized as the finger pressing scar. Because the width of each boundary domain 90 also becomes large, there is a problem that the loss of the optical transmission factor for the panel is produced. Although the reverse rotation domains 80 contribute to the optical transmission factor, the boundary domains 90 are still the dark condition at the time of the white display (i.e., at the time of applying voltage).

SUMMARY

An exemplary object of the present invention is to provide an IPS-mode LCD device which enables to fix the occurrence position of the reverse rotation domains correctly, and thereby providing excellent picture quality and reliability compared with the conventional one.

An IPS-mode liquid crystal display device according to an exemplary aspect of the invention includes:

a first substrate;

a second substrate arranged so as to oppose the first substrate;

a liquid crystal layer interposed between the first substrate and the second substrate;

a first electrode member provided on the first substrate, the first electrode member being provided with a comb-tooth-like portion;

a second electrode member provided on the first substrate to generate an electric field between the first electrode member and the second electrode member; and a protruded electrode member branched from at least one of a portion short of a tip end portion and a portion short of a base portion of the comb-tooth-like portion so as to form a branched shape of an L-shaped portion in an integrated planar shape with combination of the protruded electrode member and one of the tip end portion and the base portion.

BRIEF DESCRIPTION OF THE DRAWINGS

Exemplary features and advantages of the present invention will become apparent from the following detailed description when taken with the accompanying drawings in which:

FIG. 2A through FIG. 2D are partial plan views showing process steps of a fabrication method of the IPS-mode AM-LCD device according to the first exemplary embodiment, respectively.

FIG. 11A is a plan view illustrating an example of structure of an IPS-mode AM-LCD device according to a related art.

FIG. 11B is a cross sectional view taken along the I-I line shown in FIG. 11A.

FIG. 11C is a cross sectional view taken along the II-II line shown in FIG. 11A.

FIG. 12A through FIG. 12D are partial plan views showing process steps of a fabrication method of the LCD device shown in FIG. 11.

EXEMPLARY EMBODIMENT

Exemplary embodiments of the present invention will now be described in detail in accordance with the accompanying drawings.

An IPS-mode LCD device of the present invention is characterized in that the tip end portion of the comb tooth electrode has a branched shape in which the reverse rotation domains generate in the vicinity thereof such that each branched shape surrounds the reverse rotation domain at the time of driving the liquid crystal. Hereinafter, its specific structure will be described with reference to the drawings.

Exemplary Embodiment 1

Figure 1A:
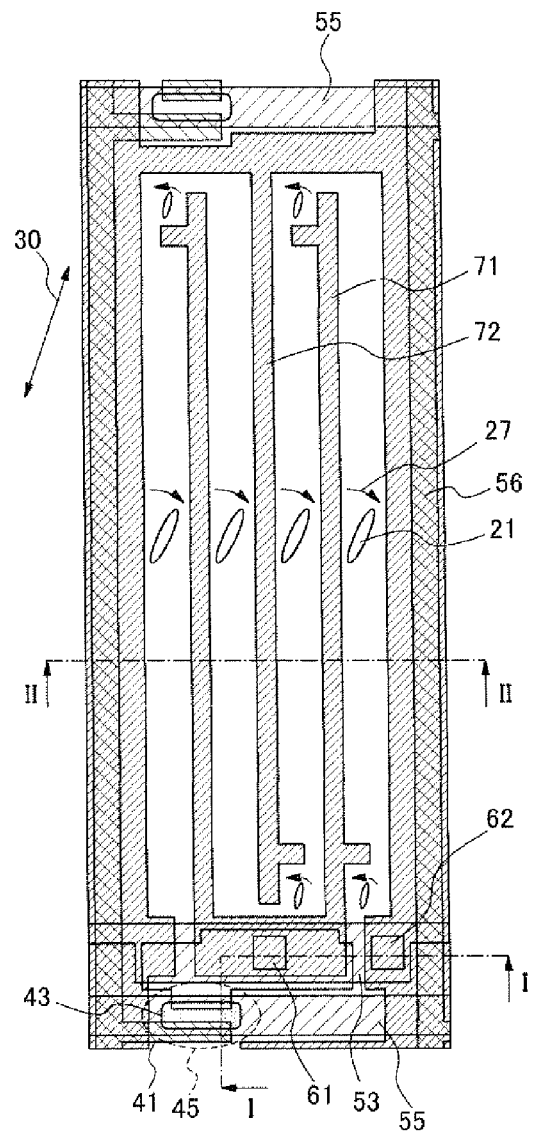
FIG. 1A is a plan view illustrating a structure of an IPS-mode AM-LCD device according to a first exemplary embodiment of the present invention.
Figure 1B:
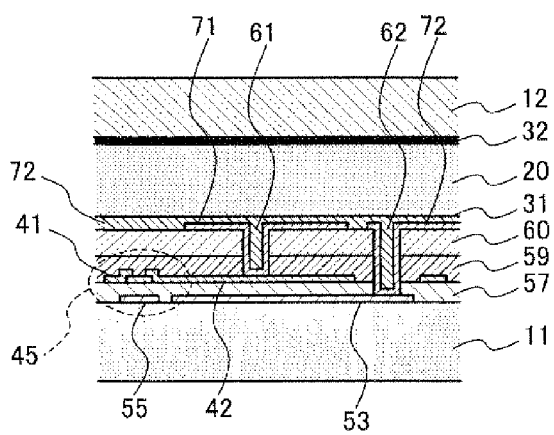
FIG. 1B is a cross sectional view taken along the I-I line shown in FIG. 1A.
Figure 1C:
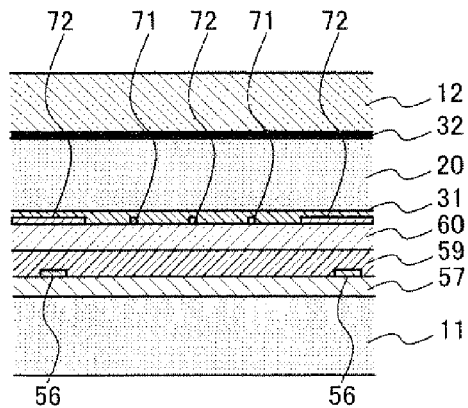
FIG. 1C is a cross sectional view taken along the II-II line shown in FIG. 1A.

FIG. 1A through FIG. 1C shows a structure of an IPS-mode active-matrix addressing LCD device according to a first exemplary embodiment of the present invention. FIG. 1A is a partial plan view of the device, FIG. 1B is a partial cross-sectional view along the I-I line shown in FIG. 1A, and FIG. 1C is a partial cross-sectional view along the II-II line shown in FIG. 1A. FIG. 2A, FIG. 2B, FIG. 2C and FIG. 2D are partial plan views showing process steps of a fabrication method of the LCD device according to the first exemplary embodiment, respectively. All of these drawings show the structure of one pixel region.

With this LCD device, as shown in FIG. 1A and FIG. 2B, rectangular regions are formed by gate bus lines 55 extending along the horizontal direction of FIG. 1A and FIG. 2B and drain bus lines 56 extending along the vertical direction thereof. Pixel regions are formed in the respective rectangular regions. Pixels (and the pixel regions) are arranged in a matrix array as a whole.

Common bus line 53 is formed to extend along the horizontal direction of FIG. 1A and FIG. 2B for each pixel, similar to the gate bus lines 55. At the respective intersections of the gate bus lines 55, drain bus lines 56, and TFTs 45 (see FIG. 11A and FIG. 11b) are formed to correspond to the respective pixels. The drain electrode 41, the source electrode 42, and the semiconductor film 43 of each TFT 45 are formed to have the patterns or shapes shown in FIG. 2B, respectively.

The pixel electrode 71 and the common electrode 72, which generate an LC driving electric field, have the shapes or patterns shown in FIG. 1A. Specifically, the common electrode 72 includes a frame-like main part formed to surround the pixel region, and a comb-tooth-like portion (i.e., a thin belt-shaped part protruding downward in the pixel region) extending from the middle of the upper side of the main part toward the lower side thereof in the inner space of the main part.

The main part of the common electrode 72 is unified with the main parts of the common electrodes (not shown) for the other pixel regions. The lower (top) end of the comb-tooth-like portion is not contacted with the lower side thereof.

On the other hand, the pixel electrode 71 is located in the rectangular inner space of the common electrode 72. The pixel electrode 71 includes a rectangular plate-like main part formed to be overlapped with the source electrode 42, and two comb-tooth-like portions (i.e., two thin belt-shaped parts protruding upward in the pixel region) extending respectively from the two ends of the lower side of the main part toward the upper side thereof.

These comb-tooth-like portions are arranged at each side of the comb-tooth-like portion of the common electrode 72. Therefore, these parts are laid out in such a way to be mated or engaged with each other in the pixel region.

The distances between the comb-tooth-like portion of the common electrode 72 and the comb-tooth-like portions of the pixel electrode 71 at each side thereof are approximately equal to the distances between the respective comb-tooth-like portions of the pixel electrode 71 and the main part of the common electrode 72.

The main part of the pixel electrode 71 is electrically connected to the corresponding source electrode 42 of the TFT 45 by way of the corresponding contact hole 61 that penetrates through an organic interlayer film 60 and a protective insulating film 59.

The main part of the common electrode 72 is electrically connected to the corresponding common bus line 53 by way of the corresponding contact hole 62 that penetrates through the organic interlayer film 60, the protective insulating film 59, and an interlayer insulating film 57.

Their connection states are the same as those of the related-art LCD device shown in FIG. 1B. Part of the source electrode 42 of the TFT 45 is overlapped with the corresponding common bus line 53 by way of the interlayer insulating film 57, thereby forming a storage capacitor for the pixel region by the overlapped part.

Each comb-tooth-like portion of the pixel electrode 71 has a branched shape in the tip end portion. That is, a protruded portion is provided such that it is branched from a part short of the tip end portion of each comb-tooth-like portion, and a planar shape formed by combining the protruded portion and the tip end portion of the comb-tooth-like portion together provides an approximately L-like shape.

Figure 13:
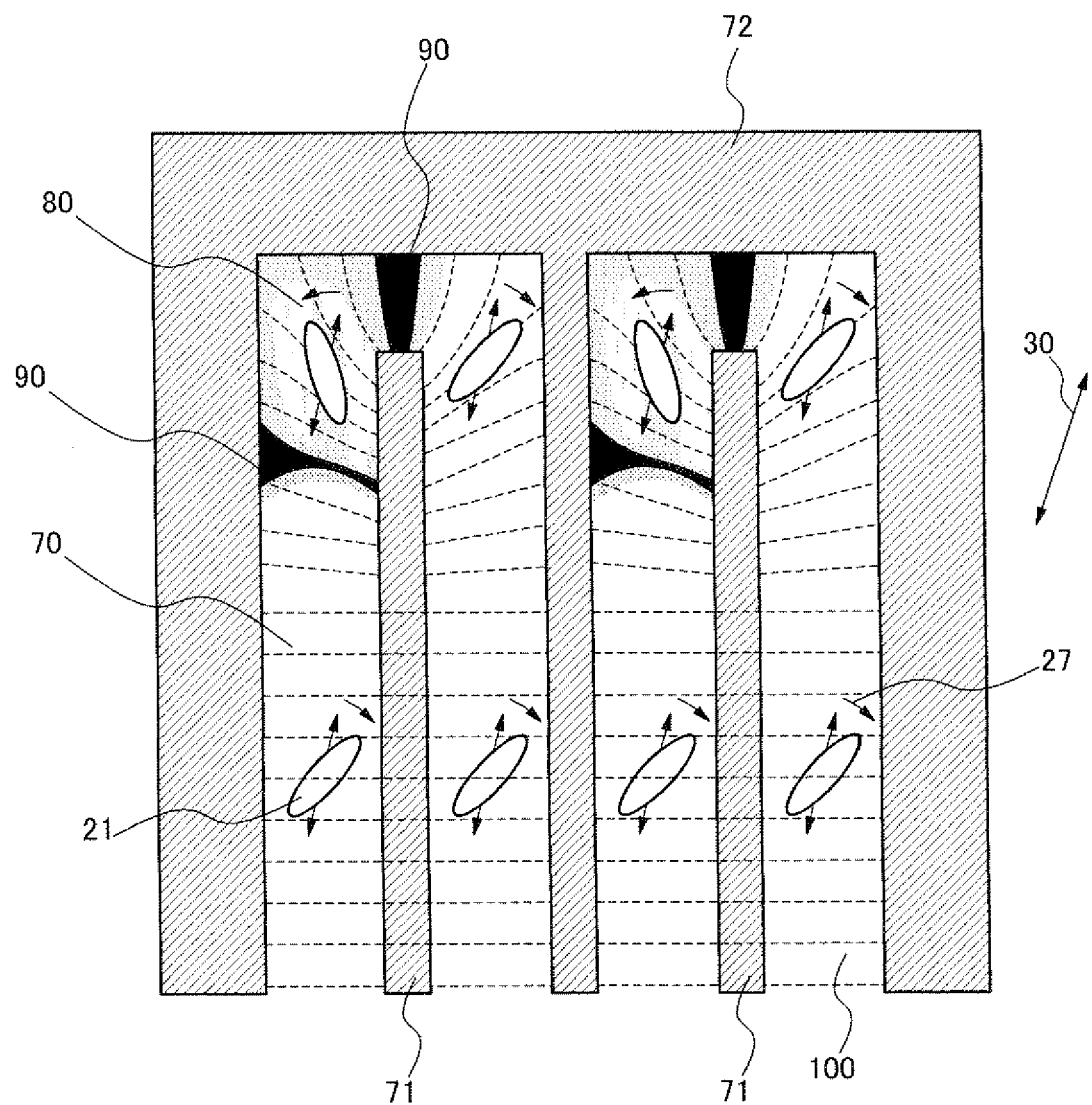
FIG. 13 is an enlarged partial plan view of an upper part side of the pixel region shown in FIG. 11 to indicate a state when applying voltage between a pixel electrode and a common electrode and generating an LC driving electric field.

The protruded portion is arranged only on a selected side of the tip end portion such that the selected side is such an area where the LC driving electric field to be generated in the vicinity of the tip end portion in the case of without such branched shape (referred to FIG. 13) causes a reverse rotation of the LC molecules which is opposite to a ordinary rotation direction of the LC molecules.

Similarly, each comb-tooth-like portion of the common electrode 72 has a branched shape in the tip end portion. That is, a protruded portion is provided such that it is branched from apart short of the tip end portion of each comb-tooth-like portion of the common electrode 72, and a planar shape formed by combining the protruded portion and the tip end portion of the comb-tooth-like portion together provides an approximately L-like shape.

The protruded portion is arranged only on a selected side of the tip end portion of the common electrode 72 such that the selected side is such an area where the LC driving electric field to be generated in the vicinity of the tip end portion in the case of without su h branched shape causes a reverse rotation of the LC molecules which is opposite to a ordinary rotation direction of the LC molecules.

Further, one of the two comb-tooth-like portions of the pixel electrode 71 also has the branched shape in its base end portion (the right side in FIG. 1A). That is, a protruded portion is provided such that it is branched from a part short of the base end portion of right side of the comb-tooth-like portion of the pixel electrode 71, and a planar shape formed by combining the protruded portion and the base end portion of the comb-tooth-like portion together provides an approximately L-like shape.

The protruded portion is arranged only on a selected side of the base end portion such that the selected side is such an area where the LC driving electric field to be generated in the vicinity of the base end portion in the case of without such branched shape causes a reverse rotation of the LC molecules which is opposite to a ordinary rotation direction of the LC molecules.

As for the other one of the two comb-tooth-like portions of the pixel electrode 71 (the left side in FIG. 1A) there is no protruded portion with the branched shape because the above-mentioned reverse rotation of the LC molecules is not generated at both sides of the base end portion.

Regarding the base end portion of the comb-tooth-like portion of the common electrode 72, although the LC driving electric field causes reverse rotation of the LC molecules at one side of its base end portions (the right side in FIG. 1A), there is no protruded portion with the branched shape because the protruded portions are provided such that they are branched from parts short of the tip end portions of the comb-tooth-like portions of the pixel electrode 71 at those areas nearby the base end portion of the comb-tooth-like portion of the common electrode 72 as mentioned above.

As to the branched shape in the present invention, it may be constructed such that both of the branch portion divided into two are arranged so as to be symmetrical relation to the starting point of the branch, but its shape is not need to be so.

Further, in this exemplary embodiment, although one comb-tooth-like portion of the common electrode 72 and two comb-tooth-like portions of the pixel electrode 71 are illustrated, the number of those are not limited to the case shown in the drawing.

In the drawings illustrating the structure of the exemplary embodiment according to the present invention, although the outline of the planar shape of each electrode is indicated straight with corners at right angles, those outline may by arranged such that extending in an oblique direction or having curve profile. The angle of its corners can be made to have a round shape. Similarly, the cross-sectional shape of the electrodes may be made to have such shape including inclined side edges or curved line against the substrate surface.

The cross-sectional structure of the LCD device according to the first exemplary embodiment is shown in FIG. 1B and FIG. 1C, where the device is configured by coupling and unifying an active-matrix substrate and an opposite substrate to sandwich a liquid crystal layer between them.

The active-matrix substrate includes a transparent glass substrate 11, the common bus lines 53, the gate bus lines 55, the drain bus lines 56, the TFTs 45, the pixel electrodes 71, and the common electrode 72, all of which are formed on or over the inner surface of the glass substrate 11. The common bus lines 53 and the gate bus lines 55, which are directly formed on the inner surface of the glass substrate 11, are covered with the interlayer insulating film 57.

The drain electrodes 41, the source electrodes 42, and the semiconductor films 43 of the TFTs 45, the drain bus lines 56 are formed on the interlayer insulating film 57. Thus, the common bus lines 53 and the gate bus lines 55 are electrically insulated from the drain electrodes 41, the source electrodes 42, the semiconductor films 43, and the drain bus lines 56 by the interlayer insulating film 57.

These structures formed on the glass substrate 11 are covered with the protective insulating film 59 except for the regions where the contact holes 61 and 62 are formed. The level differences caused by the contact holes 61 and 62 are planarized by the organic interlayer film 60 formed on the protective insulating film 59.

The pixel electrode 71 and the common electrode 72 are formed on the organic interlayer film 60. As explained above, the pixel electrode 71 is electrically connected to the corresponding source electrode 42 by way of the corresponding contact hole 61, and the common electrode 72 is electrically connected to the corresponding common bus line 53 by way of the corresponding contact hole 62.

The cross-sectional views of FIG. 1B and FIG. 1C are schematically drawn and thus, they do not reproduce the actual level differences faithfully.

The surface of the active matrix substrate having the above-described structure, on which the pixel electrodes 71 and the common electrode 72 are formed, is covered with an alignment film 31 formed by an organic polymer film. The surface of the alignment film 31 has been subjected to an alignment treatment for directing the initial orientation direction of the LC molecules 21 to a desired direction (see a both way arrow 30 in FIG. 1A).

On the other hand, the opposite substrate comprises a transparent glass substrate 12; and a color filter (not shown) including the three primary colors of R, G and B, and a light-shielding black matrix (not shown) formed in the regions other than those corresponding to the respective pixel regions, both of which are formed on the inner surface of the glass substrate 12. The color filter and the black matrix are covered with an acrylic-based overcoat film (not shown).

On the inner surface of the overcoat film, columnar spacers (not shown) are formed to control the gap between the active-matrix substrate and the opposite substrate. The inner surface of the overcoat film is covered with an alignment film 32 formed by an organic polymer film. The surface of the alignment film 32 has been subjected to an alignment treatment for directing the initial orientation direction of the LC molecules 21 to a desired direction (see the both way arrow 30 in FIG. 1A).

The active-matrix substrate and the opposite substrate each having the above-described structure are overlapped on each other at a predetermined gap in such a way that their surfaces on which the alignment films 31 and 32 are directed inward and opposed to each other. The liquid crystal 20 is introduced into the gap between the both substrates. The peripheries of the substrates are sealed by a sealing member (not shown) to confine the liquid crystal 20 therein. A pair of polarizer plates is arranged on the outer surfaces of the substrates, respectively.

The surfaces of the alignment films 31 and 32 are uniformly alignment-treated in such a way that the LC molecules 21 are aligned along the desired direction when no electric field is applied, as described above. The alignment direction by the alignment treatments is a direction inclined clockwise by 15 degrees with respect to the direction along which the comb-tooth parts of the pixel electrode 71 and common electrode 72 are extended (i.e., the vertical direction in FIG. 1A).

The optical transmission axes of the pair of polarizer plates are crossed at right angles. The optical transmission axis of one of the pair of polarizer plates is arranged parallel to the initial alignment direction of the LC molecules determined by the uniform alignment treatment.

In addition, the initial alignment direction (i.e., the alignment treatment direction) of the LC molecules 21 is a direction inclined clockwise by 15 degrees with respect to the direction along which the comb-tooth parts of the pixel and common electrodes 71 and 72 are extended (i.e., the vertical direction in FIG. 1A). See the both way arrow 30 in FIG. 1A. For this reason, when an LC driving electric field 100 is applied to the LC molecules 21, the molecules 21 will rotate clockwise (see the curved arrows 27 in FIG. 1A).

Next, the fabrication process steps of the LCD device according to the first exemplary embodiment shown in FIG. 1A through FIG. 1C will be explained below with reference to FIG. 2A through FIG. 2D.

The active-matrix substrate is fabricated in the following way. First, a Cr film is formed on one of the surfaces of the glass substrate 11 and patterned, thereby forming the common bus line 53 and the gate bus lines 55, each having the shapes as shown in FIG. 2A. Thereafter, the interlayer insulating film 57, which is formed by a SiNx film, is formed to cover the common bus lines 53 and the gate bus lines 55 over the whole surface of the glass substrate 11.

Subsequently, the semiconductor film 43 (which are usually formed by an a-Si film) is formed to have island-shaped patterns on the interlayer insulating film 57 in such a way to be overlapped with the corresponding gate bus lines 55 by way of the interlayer insulating film 57. Another Cr film is then formed on the interlayer insulating film 57 and is patterned, thereby forming the drain bus lines 56, the drain electrodes 41, and the source electrodes 142 (see FIG. 2B).

Thereafter, the protective insulating film 59 made of SiNx and the organic interlayer film 60 made of photosensitive acrylic resin are successively laminated on the interlayer insulating film 57 in this order. Following this, the rectangular contact holes 61 penetrating through the protective insulating film 59 and the organic interlayer film 60 and the rectangular contact holes 62 penetrating through the interlayer insulating film 57, the protective insulating film 59, and the organic interlayer film 60 are formed (see FIG. 2C).

An ITO film, which is a transparent conductive material, is formed on the organic interlayer film 60 and patterned, and thereby forming the pixel electrodes 71 and the common electrode 72 on the organic interlayer film 60.

The pixel electrode 71 is in contact with the corresponding source electrode 42 by way of the corresponding contact hole 61. The common electrode 72 is in contact with the common bus line 53 by way of the corresponding contact hole 62. In this way, the active-matrix substrate is fabricated.

The opposite substrate (e.g., a color filer substrate) is fabricated in the following way. First, the color filter (not shown) and the light-shielding black matrix (not shown) are formed on the glass substrate 12 and thereafter, the overcoat film (not shown) is formed to cover the color filter and the black matrix over the entire surface of the glass substrate 12. Then, the columnar spacers (not shown) are formed on the overcoat film. In this way, the opposite substrate is fabricated.

The alignment films 31 and 32, which are made of polyimide, are formed on the surfaces of the active-matrix substrate and the opposite substrate fabricated as described above, respectively. Next, the surfaces of the alignment films 31 and 32 are uniformly alignment-treated. These two substrates are then overlapped to have a constant gap (e.g. approximately 4.5 µm), and the peripheries of the substrates are sealed by the sealing member except for an injection hole for the liquid crystal.

Next, in a vacuum chamber, a predetermined nematic liquid crystal (e.g., a p-type nematic liquid crystal whose refractive index anisotropy is 0.067) is injected into the gap between the substrates through the injection hole and thereafter, the injection hole is sealed.

After the substrates are coupled and unified in this way, the polarizer plates (not shown) are respectively adhered on the outer surfaces of the substrates. As a result, the LCD device according to the first exemplary embodiment shown in FIG. 1A through FIG. 1C is completed.

An n-type nematic liquid crystal may be used. In this case, it is sufficient that only the alignment direction is made different by 90 degrees with respect to the above-described angle while keeping the other elements the same. In the following explanation, a p-type nematic liquid crystal is used.

Figure 3:
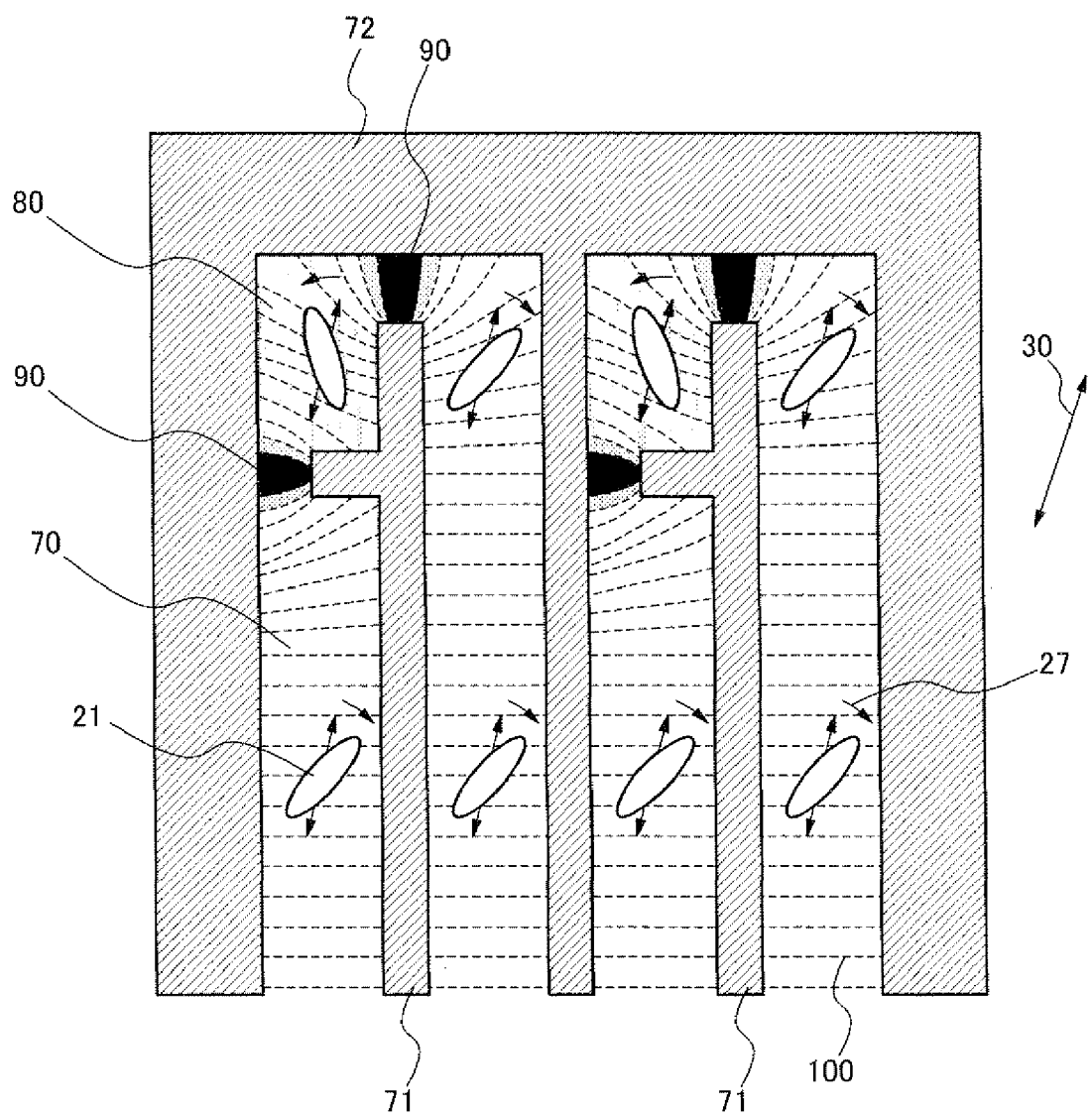
FIG. 3 is an enlarged partial plan view of an upper part side of the pixel region shown in FIG. 1A to indicate a state when applying voltage between a pixel electrode and a common electrode and generating an LC driving electric field.
Figure 4:
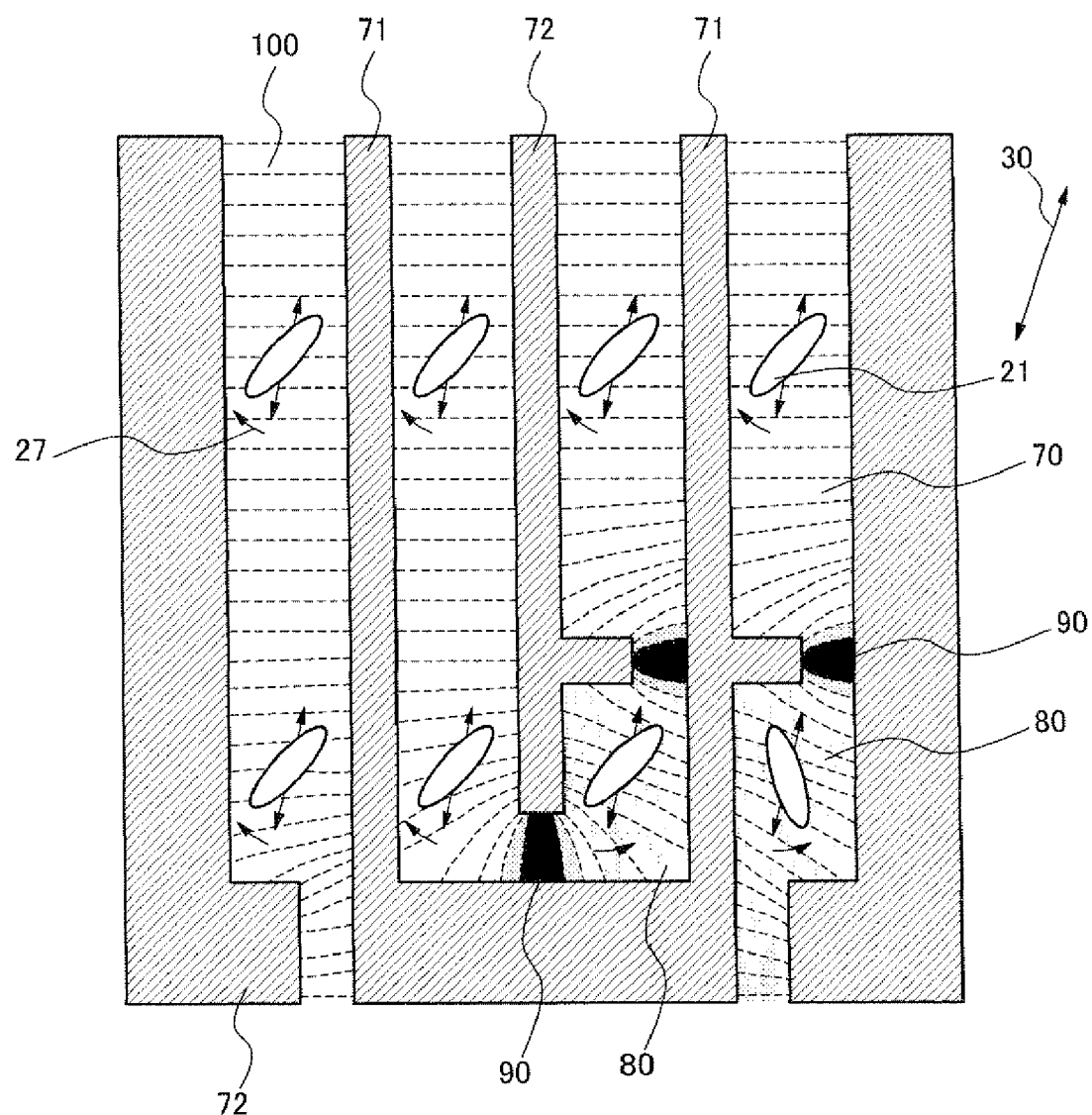
FIG. 4 is an enlarged partial plan view of a lower part side of the pixel region shown in FIG. 1A to indicate a state when applying the voltage between the pixel electrode and the common electrode and generating the LC driving electric field.

The operation of the LCD device according to the first exemplary embodiment will be explained below with reference to FIG. 3 and FIG. 4. In FIG. 3, the state of the LC driving electric field 100 generated by applying a voltage between the pixel electrode 71 and the common electrode 72 is shown by broken lines that denote the electrical lines of force of the electric field. In addition, the rotation direction of the LC molecules 21 due to the action of the LC driving electric field is shown by curved arrows 27. In FIG. 4, the similar state is shown for the lower part side of the pixel region shown in FIG. 1A.

As described previously, the initial alignment direction of the LC molecules 21 is a direction inclined clockwise by 15 degrees with respect to the direction along which the comb-tooth parts of the pixel electrode 71 and the common electrode 72 are extended (i.e., the vertical direction in FIG. 1A). Therefore, when the LC driving electric field is applied, the molecules 21 are rotated clockwise in the ordinary regions.

On the other hand, as shown in FIG. 3 and FIG. 4, the LC molecules rotate counterclockwise and generate the reverse rotation domains 80 because the LC driving electric field is generated so as to be inclined clockwise to the horizontal direction of the drawings in the following areas.

First areas (i.e., two areas shown in FIG. 3) are those areas surrounded by the approximately L-like shape provided on the tip end portions of the comb-tooth-like portions of the pixel electrode 71 and its counter facing is common electrode 72 (the main portion and the base end portion of the comb-tooth-like portion);

a second area (i.e., the area close to a center of FIG. 4) is the area surrounded by the approximately L-like shape provided on the tip end portion of the comb-tooth-like portions of the common electrode 72 and its counter facing pixel electrode 71 (i.e., the main portion and the base end portion of the comb-tooth-like portion); and a third area (i.e., the area close to a right side of FIG. 4) is the area surrounded by the approximately L-like shape provided on the base end portion of the comb-tooth-like portions of the pixel electrode 71 and the main portion of its counter facing common electrode 72.

The boundary domains 90 are formed between these reverse rotation domains 80 and ordinary areas or ordinary domains 70, and thus the dark condition is produced even in the time of applying voltage thereto. However, those boundary domains 90 are limited to a small area due to the functions of the branched shape provided on the pixel electrode 71 and the common electrode 72. This is because the inclined direction of the LC driving electric field is reversed greatly at either side of the protruded portion of the branched shape as the boundary, and therefore, the clockwise rotation and the counterclockwise rotation are caused by strong torque respectively in the respective sides.

That is, by the function of the branched shape provided on the pixel electrode 71 and the common electrode 72, the generated positions of the reverse rotation domains 80 and the boundary domains 90 can be fixed on the predetermined positions correctly.

Therefore, the reverse rotation domains 80 generated in the vicinity of the comb tooth electrode tip end portions stabilizes, and thus the finger pressing scars are difficult to remain on the display screen because the shape of the reverse rotation domains 80 cannot be transformed by the external pressure such as the finger pressing.

Furthermore, because the dark domain (i.e., the boundary domain 90) that occurs to the boundary section of the reverse rotation domains 80 and the ordinary domains 70 can be controlled compactly, it is possible, as the result, to improve the optical transmission factor as a display element and realize the increased brightness or the reduction in consumption power.

Hereinafter, the example is given and it is supplemented about advantages relating to the improvement of the optical transmission factor in particular among the above-mentioned advantages. When this exemplary embodiment was applied to an 10.4 inch-type LCD device with the number of pixels of 640 pixels (×RGB) in width and 480 pixels in height, an optical transmittance of the display panel part was measured, and the transmission factor of the 7.9% was observed.

On the other hand, when the comb tooth electrode of the related art configuration is used without using the structure of this exemplary embodiment, its optical transmission factor was 7.5%. This difference corresponds to the improvement effect by controlling the boundary domain compactly by the structure of this exemplary embodiment.

When suppressing the occurrence of the reverse rotation domains completely by the electrode shape of a saw-blade type as shown in Japanese Unexamined Patent Application No. 1998-26767 (patent document 6), which corresponds to U.S. Pat. No. 5,905,556 issued to the inventors including the same inventor of the present invention on May 18, 1999), the measured optical transmission factor for the panel was 7.2%. That is, it was confirmed that the optical transmission factor can be improved by using the structure of this exemplary embodiment.

Exemplary Embodiment 2

Figure 5:
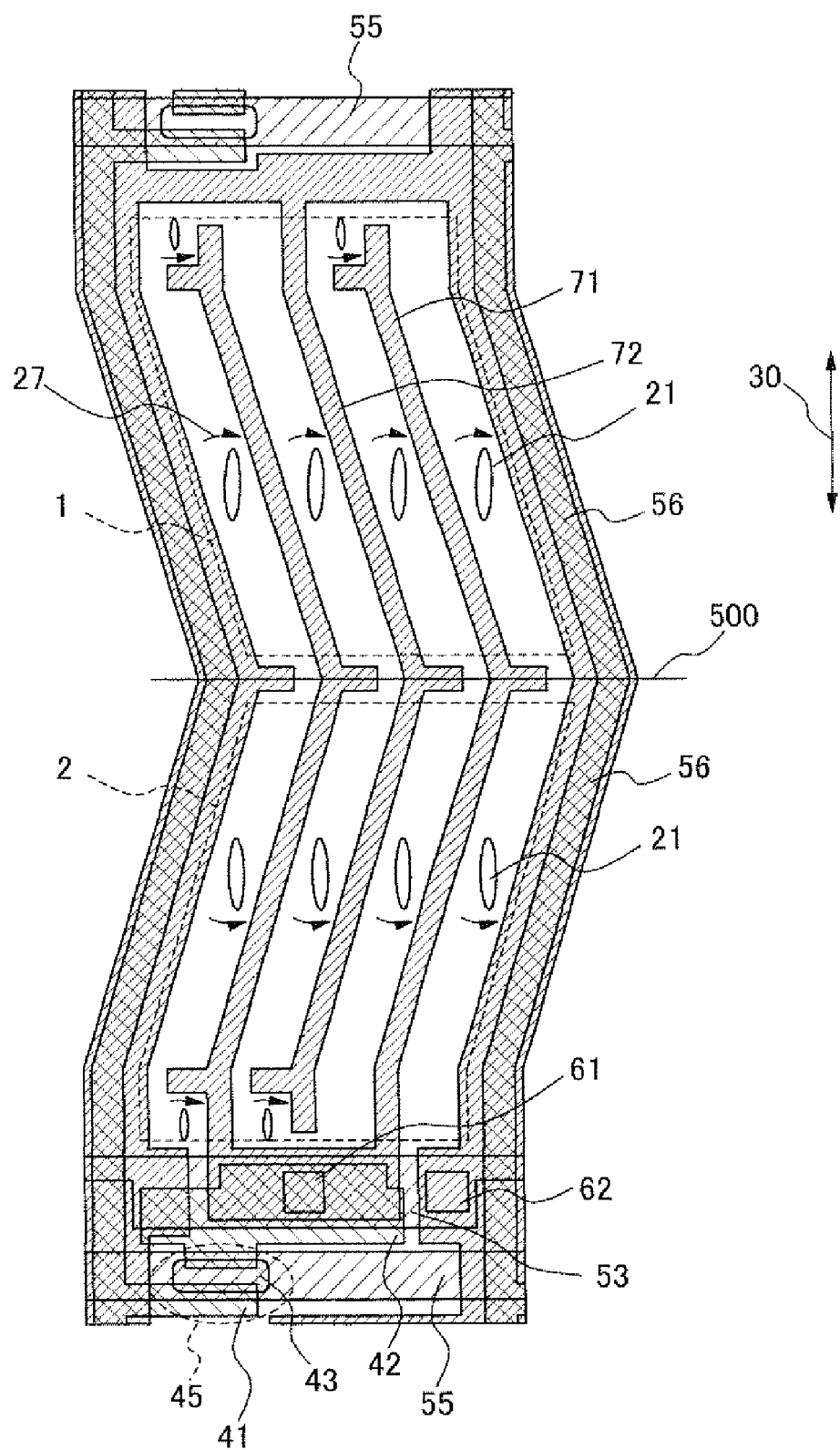
FIG. 5 is a plan view illustrating a structure of an IPS-mode AM-LCD device according to a second exemplary embodiment of the present invention.

The LCD device according to a second exemplary embodiment of the present invention is shown in FIG. 5. In the structure of the LCD device of this exemplary embodiment, the pixel electrode and the common electrode for generating the LC driving electric field are arranged to have bended-shape by referring the technology disclosed in the above-mentioned patent document 5.

This exemplary embodiment is different from the structure according to the first exemplary embodiment of the present invention in such a point that the bended portion is used to intentionally make the driving direction (or rotating direction) of the LC molecules differently for each area at the time of the LC driving electric field affects it.

Other points besides that is the same structure of the first exemplary embodiment. Therefore, the identical elements in both exemplary embodiments are designated with the same reference numerals as in the case of the first exemplary embodiment and thereby omitting the description of them.

In this second exemplary embodiment, as shown in FIG. 5, although the pixel electrodes 71 and the common electrodes 72 which generate the LC driving electric field 100 have the comb-tooth-like portions which engages mutually like the structure of the first exemplary embodiment, the comb-tooth-like portions are bended to have approximately V-shape with a straight boundary-line 500 which extends in a horizontal direction in FIG. 5 at approximately central part of the pixel region. Corresponding to this, the drain bus lines 56 extending in the vertical direction in FIG. 5 are also bended similarly to have approximately V-shape. Accordingly, the shape of the pixel region also bends to have approximately V-shape.

The pixel region is divided into a first sub area 1 on an upper side of the boundary-line 500 and a second sub area 2 on an underside of the boundary-line 500 at the bended position. The pixel electrodes 71 and the common electrodes 72 are bended in a predetermined angle such that they bend counterclockwise to the vertical direction of the drawing in the first sub area 1, and they bend clockwise in the second sub area 2 with the same angle as the first sub area 1.

The orientation processing direction of the LC molecules 21 is set so that the LC molecules 21 may be oriented in parallel along the vertical direction (refer to the both way arrow 30 in FIG. 5) of the drawing at the time of no voltage applied.

As for an angle (or an off set angle) of extending direction of the pixel electrode 71 and the common electrode 72 in each area, it is desirable to have a value within a range in the order of from ±10 degrees to ±25 degrees against the orientation processing direction, and for example, it can be made such degrees as in the order of ±15 degrees (15 degrees in counterclockwise in the first sub area 1 and 15 degrees in clockwise in the second sub area 2).

Although LC driven threshold voltage decreases if the off set angle is made large, the peak voltage for achieving the maximum transmittance increases. That is, the optical transmission factor curve to the applied voltage becomes gentle.

When the offset voltage is small conversely, the optical transmission factor curve becomes steep. If the offset angle is made large, the boundary position of the LC domains at the bended portion of the comb tooth electrode is tended to be fixed stably.

When the LC driving voltage being applied, the LC driving electric field in the main area in the first sub area 1 is generated in a direction slightly tilted counterclockwise to the horizontal direction (direction of the straight boundary-line 500) in the drawing, while the LC driving electric field in the main area in the second sub area 2 is generated in a direction slightly tilted clockwise to the horizontal direction in the drawing.

Therefore, by the LC driving electric field, the LC molecules 21 oriented uniformly along the vertical direction in the drawing at the time of no voltage applied are mainly rotated clockwise in the first sub area 1, while the LC molecules 21 mainly rotates counterclockwise in the second sub area 2. Thus, by being different in the rotation direction of the LC molecules in the first sub area 1 and the second sub area 2 each other, there is an advantage that coloring of the display due to changes of viewing angles can be suppressed.

Figure 6:
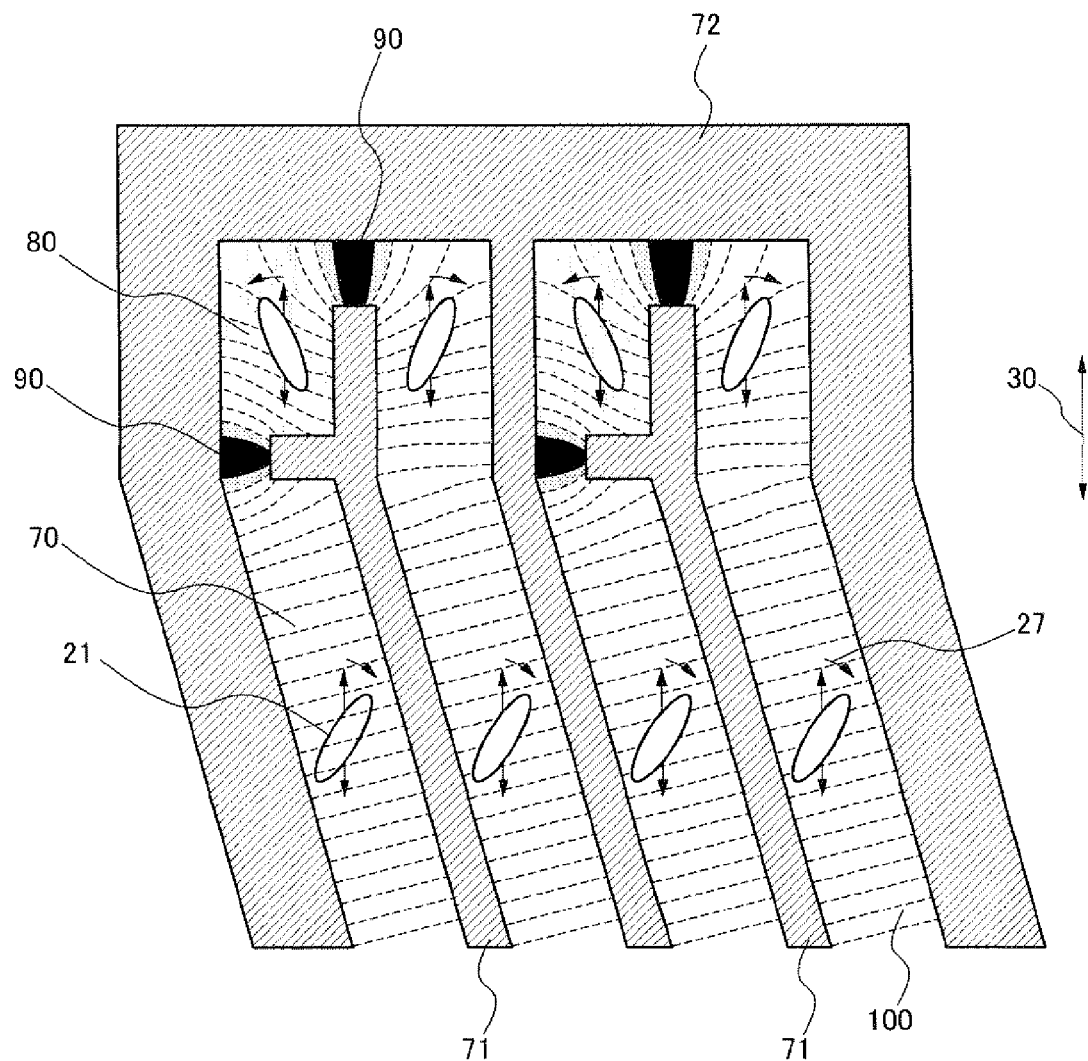
FIG. 6 is an enlarged partial plan view of an upper part side of the pixel region shown in FIG. 5 to indicate a state when applying voltage between a pixel electrode and a common electrode and generating an LC driving electric field.
Figure 7:
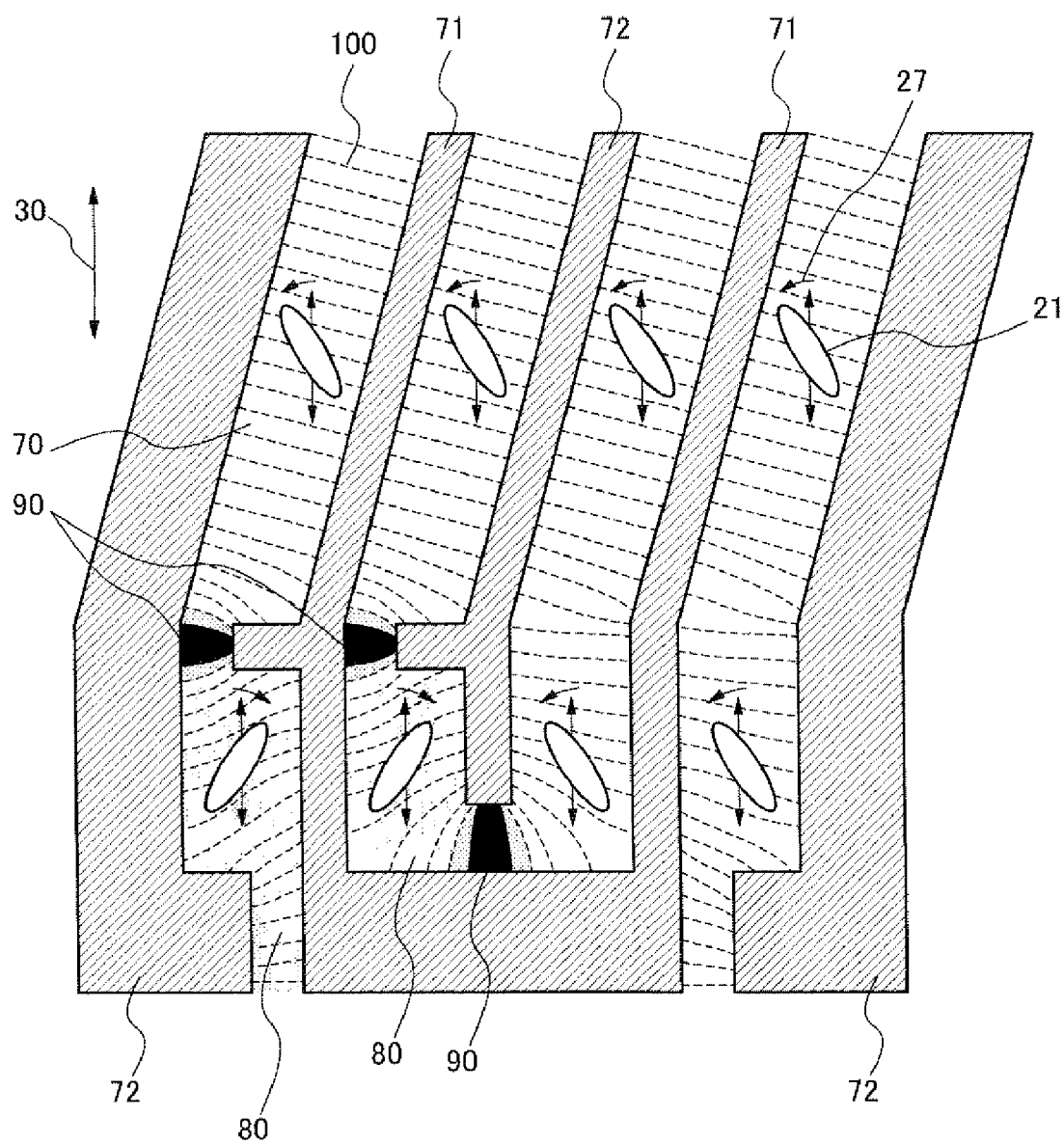
FIG. 7 is an enlarged partial plan view of a lower part side of the pixel region shown in FIG. 5 to indicate a state when applying the voltage between the pixel electrode and the common electrode and generating the LC driving electric field.

In this second exemplary embodiment, the branched shapes are provided to the pixel electrodes 71 and the common electrode 72 similar to the structure of the first exemplary embodiment. As shown in FIG. 6 and FIG. 7, by the function of the branched shape, the generated positions of the reverse rotation domains 80 and the boundary domain 90 in the first sub area 1 and the second sub area 2, respectively, can be fixed on the predetermined positions correctly.

Therefore, the reverse rotation domains 80 generated in the vicinity of the comb tooth electrode tip end portions stabilizes, and thus the finger pressing scars are difficult to remain on the display screen because the shape of the reverse rotation domains 80 cannot be transformed by the external pressure such as the finger pressing.

Furthermore, because the dark domain or the boundary domain 90 that occurs to the boundary section between the reverse rotation domains 80 and the ordinary domains 70 can be controlled compactly, it is possible, as the result, to improve the optical transmission factor as a display element and realize the increased brightness or the reduction in consumption power.

Further, in this second exemplary embodiment, the branched shape of the tip end portion of the comb-tooth-like portions of the pixel electrode 71 and the common electrode 72 is arranged such that one is arranged in the direction parallel to the initial alignment direction of the LC molecules 21 while the other is arranged in perpendicular to the direction of the above-mentioned initial alignment direction.

Moreover, planar shapes arranged by combining a pair of square brackets are formed by the combination of this branched shaped portion and the electrode facing thereto for generating the LC driving electric field (i.e., the combination of one portion as the branched shaped portion made of either one of the electrode part of the pixel electrode 71 or the common electrode 72 and the other portion of the other electrode facing the above-mentioned one portion).

With such shape, the electric field which tilted uniformly mostly to the initial alignment direction of the LC molecules can be generated, and the above-mentioned reverse rotation domains 80 can be fixed stably.

When "the shape of combining a pair of square brackets" is assumed as a rectangle, and a ratio of long side and short side is selected to be in the order of 2:1 to 3:1, and its long side is arranged so as to be parallel with the initial alignment direction of the LC molecules, the rotating degree of the LC molecules in that area will be almost the same level with the rotating degree of the LC molecules in the area where the comb tooth electrodes (i.e., the pixel electrode 71 and the common electrode 72) are spread in parallel each other (that is, the optical transmission factor curve to the applied voltage is almost identical).

Accordingly, the generated electric fields contribute to the optical transmission efficiently, and advantageous to the display device. When its ratio is smaller than the relation of the 2:1-3:1, the inclination of the LC driving electric field in this area becomes large, that is, it will be such state corresponding to such characteristic as the sate of large angle (i.e., off set angle) between the extending direction of the comb tooth electrode and the initial alignment direction of the LC molecules.

In other words, LC-driving threshold voltage decreases, and the peak voltage for achieving the maximum transmittance increases. The curve of the transmission factor to the applied voltage becomes gentle. In contrast, when its ratio is large, the inclination of the LC driving electric field in this area becomes small, that is, it will be the corresponding characteristic when the off set angle is small. Although the above-stated ratio of around 2:1-3:1 is most desirable as mentioned above, it is possible to make it in a range of about 1:1 to 4:1.

In this exemplary embodiment, as mentioned above, although the extended directions of two tip end portions of the comb-tooth-like portions are perpendicular and parallel to the initial alignment direction of the LC molecules, respectively, so as to generate the LC driving electric field which inclined to the desirable direction with such relation, no such strict relation between the two extended directions of the tip end portions and the initial alignment direction of the LC molecules is required, but it is possible to be shifted a little from the above-mentioned desired relation.

However, it is desirable that the respective relations are arranged to be less than the off set angle (in the above-mentioned examples 15 degrees) between the extending direction of the main part of the comb-tooth-like portions and the initial alignment direction of the LC molecules.

Exemplary Embodiment 3

Figure 8:
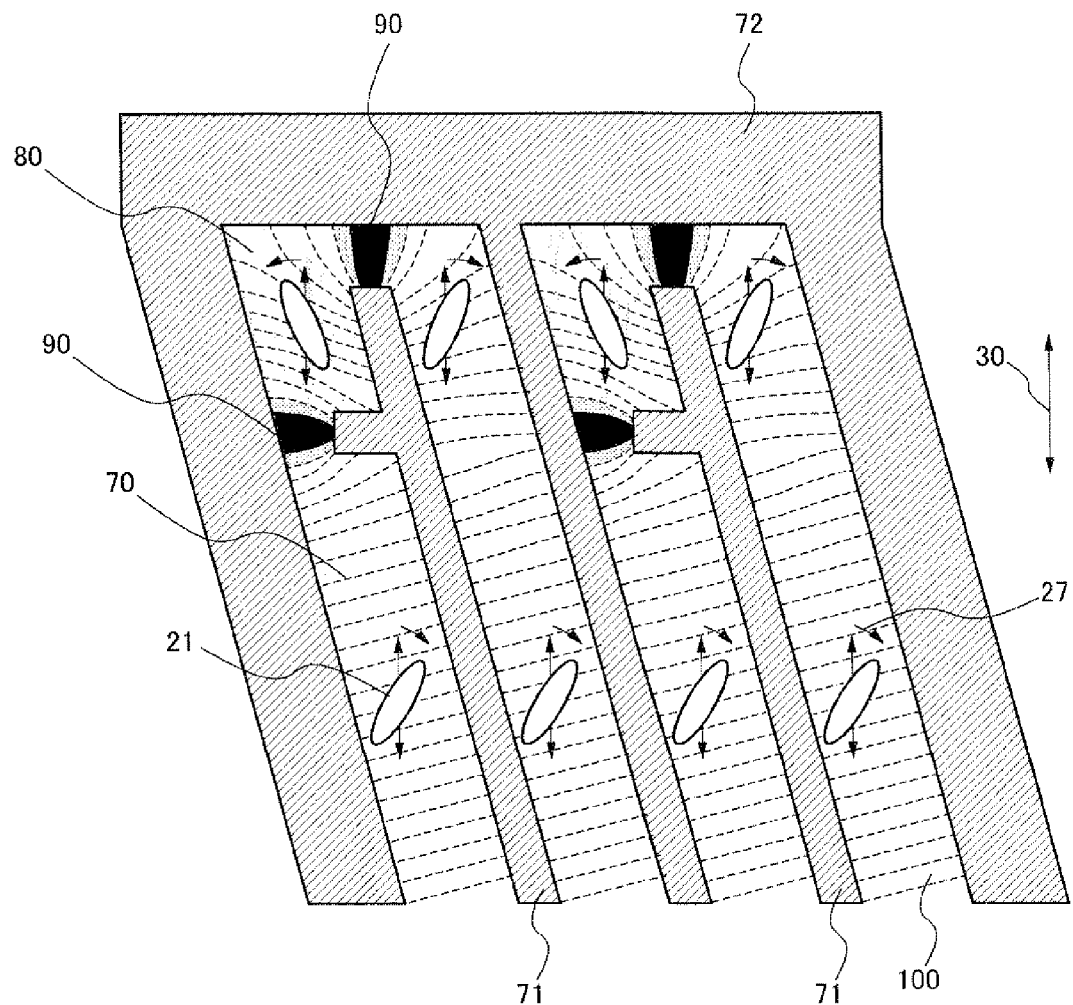
FIG. 8 is an enlarged partial plan view of an upper part side of the pixel region of an IPS-mode AM-LCD device according to a third exemplary embodiment of the present invention to indicate a state when applying voltage between a pixel electrode and a common electrode and generating an LC driving electric field.

The feature of the third exemplary embodiment of the present invention is shown in FIG. 8. The branched shape of the comb tooth electrode tip end portions may be made to have the shape as shown in FIG. 8. As shown in FIG. 8, by the function of the branched shape, the generated positions of the reverse rotation domains 80 and the boundary domain 90 in the first sub area 1 and the second sub area 2, respectively, can be fixed on the predetermined positions correctly.

Therefore, the reverse rotation domains 80 generated in the vicinity of the comb tooth electrode tip end portions stabilizes, and thus the finger pressing scars are difficult to remain on the display screen because the shape of the reverse rotation domains 80 cannot be transformed by the external pressure such as the finger pressing.

Other points besides that is the same structure of the first exemplary embodiment. Therefore, the identical elements in both exemplary embodiments are designated with the same reference numerals as in the case of the first exemplary embodiment and thereby omitting the description of them.

In addition to the shape as shown in FIG. 8, various shapes are possible such that the protruded portion in the branch is bended and curved. Regarding the shape of electrodes, the shape shown in the second exemplary embodiment is more desirable. This is because the second exemplary embodiment has higher optical transmittance in the reverse rotation domains 80.

Exemplary Embodiment 4

Figure 9:
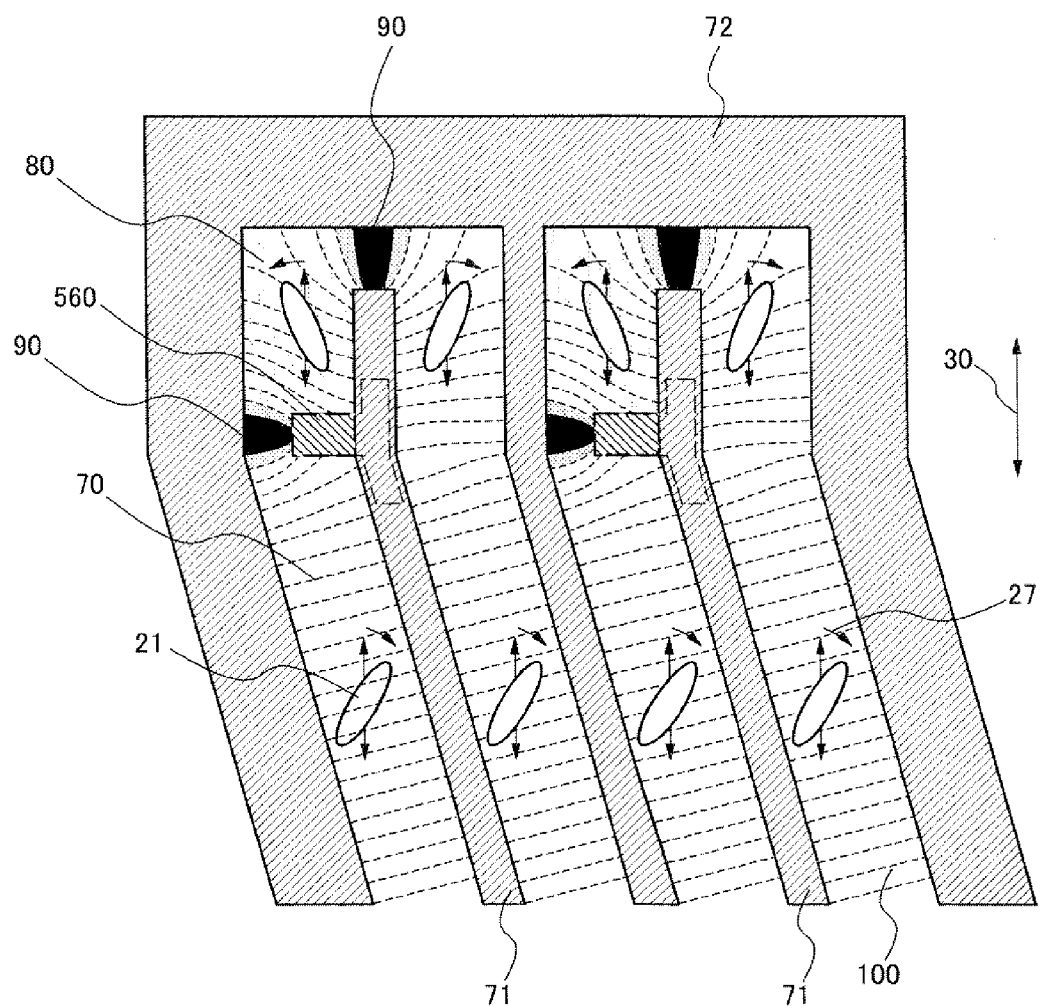
FIG. 9 is an enlarged partial plan view of an upper part side of the pixel region of an IPS-mode AM-LCD device according to a fourth exemplary embodiment of the present invention to indicate a state when applying voltage between a pixel electrode and a common electrode and generating an LC driving electric field.
Figure 10:
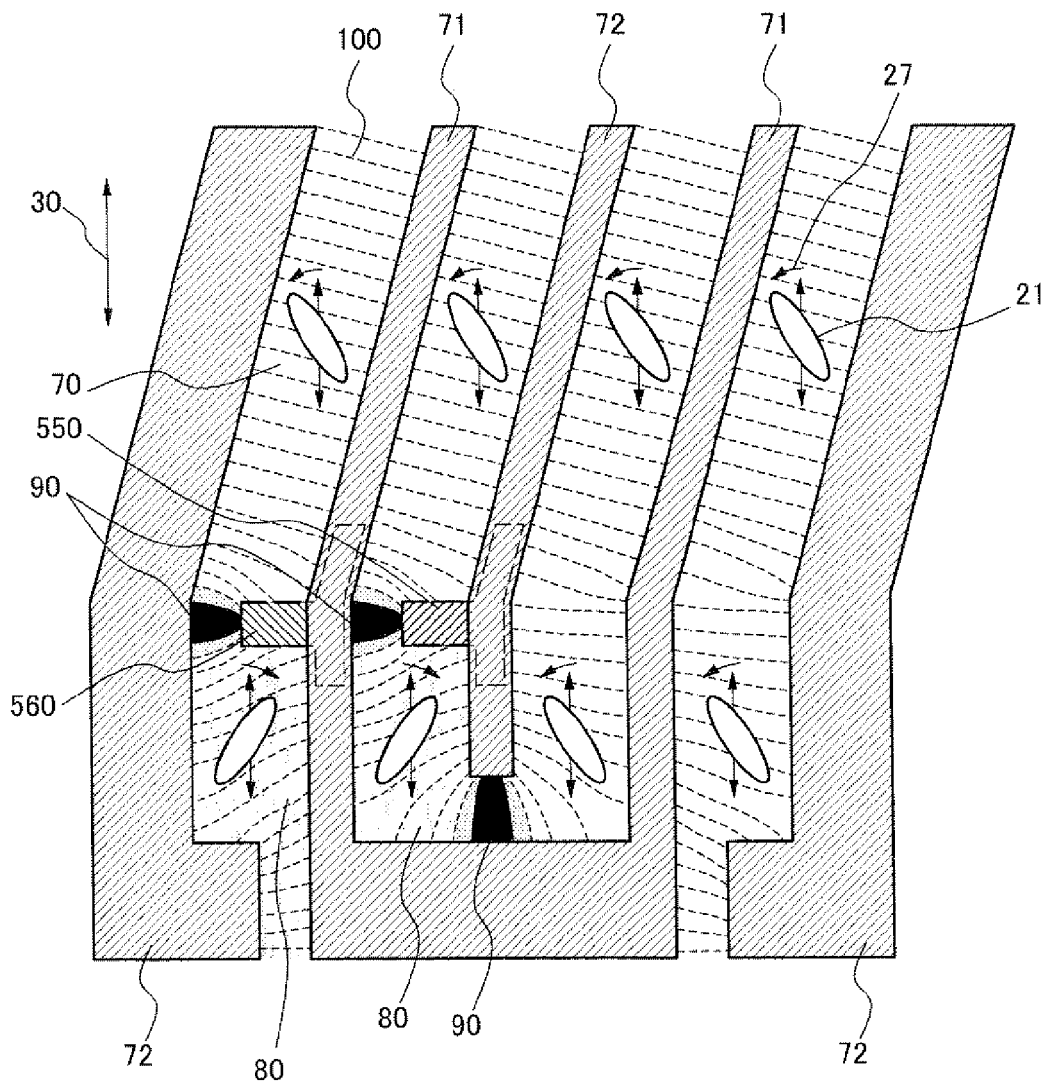
FIG. 10 is an enlarged partial plan view of a lower part side of the pixel region of an IPS-mode AM-LCD device according to the fourth exemplary embodiment of the present invention to indicate a state when applying voltage between a pixel electrode and a common electrode and generating the LC driving electric field.

The feature of a fourth exemplary embodiment of the present invention is shown in FIG. 9 and FIG. 10. In this exemplary embodiment, although the tip end portion itself of the comb tooth electrode is not made to have the branched shape, it is provided with T-shaped stabilization electrodes 560 for stabilizing reverse rotation domains 80 so as to overlap with the tip end portion of the comb tooth electrode. A planar shape, which is formed by integrating the stabilization electrode and the comb-tooth-like electrode, has a similar feature of the shape of the comb tooth electrode of the second exemplary embodiment.

The stabilization electrodes 560 having the overlapping portions with the pixel electrodes 71 are formed by using a Cr film forming the drain bus lines 56 (see FIG. 1C) on the same layer, while the stabilization electrode 550 having the overlapping portions with the common electrodes 72 are formed by using another Cr film forming the gate bus lines 55 and the common bus lines 53 on the same layer (see FIG. 1B).

Because the stabilization electrodes have approximately the same electric potential of the overlapped comb tooth electrode owing to the function of the capacity formed at the overlapped portion with the comb-tooth-like electrode, the advantages of the present invention can also be obtained in such configuration.

Examples of the utilization of the present invention can be listed as follows. An IPS-mode LCD device and other devices using the same such as a monitor for computers, an LCD television, a cellular phone, a GPS (Global Positioning System) terminal, a car navigation system, a game machine, terminal display for bank and convenience store, and the medical diagnostic equipment.

An IPS-mode liquid crystal display device according to another exemplary aspect of the invention includes a liquid crystal layer interposed between a first substrate and a second substrate. The first substrate is provided with a first electrode member having a comb-tooth-like portion and a second electrode member to generate an electric field between the first electrode member and the second electrode member. Further, a stabilization electrode member for stabilizing a reverse rotation domain is provided on at least one of a portion short of a tip end portion and a portion short of a base portion of the comb-tooth-like portion so as to overlap with the comb-tooth-like portion via an insulating film. A part of the stabilization electrode member is provided with a protruded portion extended from the comb-tooth-like portion so as to form a branched shape of an L-shaped portion in an integrated planar shape with combination of the protruded portion of the stabilization electrode member and one of the tip end portion and the base portion.

Owing to the feature of the above-mentioned electrode shape, the electric field distribution generated between the comb tooth electrode tip end portion and the electrode opposing to it can be determined, and the boundary between the ordinary domains and the reverse rotation domains generated at that area can be fixed stably.

Accordingly, the reverse rotation domains generated in the vicinity of the comb tooth electrode tip end portions stabilizes, and thus the finger pressing scars are difficult to remain on the display screen because the shape of the reverse rotation domains cannot be transformed by the external pressure such as the finger pressing. Furthermore, because the dark domain (i.e., the boundary domain) that occurs to the boundary section of the reverse rotation domains and the ordinary domains can be controlled compactly, it is possible, as the result, to improve the transmission factor as a display element and realize the increased brightness or the reduction in consumption power.

According to the IPS-mode LCD device of the present invention, by adopting such fixing structure with the branched shapes for the reverse rotation domains, the present invention enables to fix the occurrence position of the reverse rotation domains correctly, and thereby providing excellent picture quality and reliability compared with the conventional one.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Further, it is the inventor's intention to retain all equivalents of the claimed invention even if the claims are amended during prosecution.

What is claimed is:

1. An in-plane switching mode liquid crystal display device, comprising:
   a first substrate;
   a second substrate arranged so as to oppose said first substrate;
   a liquid crystal layer interposed between said first substrate and said second substrate;
   a first electrode member provided on said first substrate, said first electrode member being provided with a comb-tooth-like portion;
   a second electrode member provided on said first substrate and having an interior corner portion opposing said comb-tooth like portion so as to generate an electric field between said first electrode member and said second electrode member;
   a protruded electrode member branched from adjacent to a tip end portion of said comb-tooth-like portion so as to form an L-shaped portion in an integrated planar shape; and
   a reverse rotation domain having boundaries defined by two legs of the L-shaped portion of the first electrode member and two sides of the interior corner portion of the second electrode member, wherein rotation of liquid crystal molecules in the liquid crystal layer is stabilized and in a same direction in an entirety of the reverse rotation domain and rotation is in an opposite direction beyond said boundaries while driving said liquid crystal layer.

2. The in-plane switching mode liquid crystal display device according to claim 1, wherein an extending direction of said tip end portion is approximately parallel with an initial alignment direction of said molecules of said liquid crystal layer, while a extending direction of said protruded electrode member approximately crosses at right angles in said initial alignment direction of said molecules of said liquid crystal layer.

3. The in-plane switching mode liquid crystal display device according to claim 2, wherein an extending direction of a main part of said comb-tooth-like portion except for said tip end portion is an oblique direction to said initial alignment direction of said molecules of said liquid crystal layer.

4. The in-plane switching mode liquid crystal display device according to claim 2, wherein an extending direction of a main part of said comb-tooth-like portion except for said tip end portion forms an obtuse angle against said extending direction of said protruded electrode member and said extending direction of said tip end portion.

5. The in-plane switching mode liquid crystal display device according to claim 1, wherein a rotation direction of said liquid crystal molecules of said liquid crystal layer disposed at said branched shape at a time of driving said liquid crystal layer is arranged to have an opposite direction of a rotation direction of said liquid crystal molecules outside said reverse rotation domain at a time of driving said liquid crystal layer.

6. The in-plane switching mode liquid crystal display device according to claim 1, wherein a rotation direction of said liquid crystal molecules of said liquid crystal layer as an ordinal direction at a time of driving said liquid crystal layer at a first side area opposite to said tip end portion in two side areas divided by said protruded electrode member as a boundary is arranged so as to be opposite direction of a rotation direction of said liquid crystal molecules of said liquid crystal layer at a time of driving said liquid crystal layer at a second side area of said tip end portion side in said two side areas, and said second side area is smaller than said first side area.

7. The in-plane switching mode liquid crystal display device according to claim 1, further comprising another protruded electrode member branched from adjacent to a base portion of said comb-tooth-like portion so as to form a further L-shaped portion in an integrated planar shape,
   wherein a rotation direction of said liquid crystal molecules of said liquid crystal layer as an ordinal direction at a time of driving said liquid crystal layer at a first side area opposite to said base portion in two side areas divided by said another protruded electrode member as a boundary is arranged so as to be opposite direction of a rotation direction of said liquid crystal molecules of said liquid crystal layer at a time of driving said liquid crystal layer at a second side area of said base portion side in said two side areas, and said second side area is smaller than said first side area.

8. The in-plane switching mode liquid crystal display device according to claim 1, wherein said comb-tooth-like portion is bended to have an approximately V-shaped portion at an approximately central bended portion of each pixel regions.

9. The in-plane switching mode liquid crystal display device according to claim 8, wherein a extending direction of said comb-tooth-like portion in each side of said bended portion is different from said initial alignment direction of said liquid crystal molecules of said liquid crystal layer with predetermined angle respectively, and relation in said predetermined angle is symmetrical each other in both sides of said bended portion.

10. The in-plane switching mode liquid crystal display device according to claim 1, wherein said reverse rotation domain is rectangular and a ratio of a long side and a short side thereof is selected to be in an order of 1:1 to 4:1.

11. The in-plane switching mode liquid crystal display device according to claim 10, wherein said ratio of said long side and said short side is selected to be in an order of 2:1 to 3:1.

12. The in-plane switching mode liquid crystal display device according to claim 1, wherein said reverse rotation domain is rectangular and an extending direction of a long side thereof is arranged so as to be parallel with said initial alignment direction of the molecules of said liquid crystal layer.

\* \* \* \* \*